(12) United States Patent
Klein

(10) Patent No.: US 11,885,119 B2
(45) Date of Patent: Jan. 30, 2024

(54) COMPOSITE FIRE-RATED GASKET FOR USE INBUILDING CONSTRUCTION

(71) Applicant: James Alan Klein, Bellevue, WA (US)

(72) Inventor: James Alan Klein, Bellevue, WA (US)

(*) Notice: Subject to any disclaimer, the term of this patent is extended or adjusted under 35 U.S.C. 154(b) by 58 days.

(21) Appl. No.: 17/349,505

(22) Filed: Jun. 16, 2021

(65) Prior Publication Data
US 2022/0106785 A1 Apr. 7, 2022

Related U.S. Application Data

(63) Continuation-in-part of application No. 16/853,281, filed on Apr. 20, 2020, now abandoned, which is a
(Continued)

(51) Int. Cl.
*B32B 15/04* (2006.01)
*B32B 3/30* (2006.01)
(Continued)

(52) U.S. Cl.
CPC .................. *E04B 1/76* (2013.01); *B32B 3/30* (2013.01); *B32B 5/18* (2013.01); *B32B 5/245* (2013.01); *B32B 7/12* (2013.01); *B32B 9/007* (2013.01); *B32B 9/046* (2013.01); *B32B 15/046* (2013.01); *E04B 2/7411* (2013.01); (Continued)

(58) Field of Classification Search
CPC .. B32B 3/30; B32B 5/022; B32B 5/18; B32B 5/245; B32B 7/06; B32B 7/12; B32B 9/007; B32B 9/045; B32B 9/046; B32B 15/02; B32B 15/046; B32B 15/18; B32B 27/065; B32B 27/30; B32B 27/304; B32B 27/32; B32B 29/007; B32B 2266/0228; B32B 2266/025; B32B 2266/0278; B32B 2266/08; B32B 2266/104; B32B 2305/022; B32B 2307/102; B32B 2307/304; B32B 2307/3065; B32B 2307/72; B32B 2307/732; B32B 2313/04; B32B 2405/00; B32B 2419/00; B32B 2581/00;
(Continued)

(56) References Cited

U.S. PATENT DOCUMENTS

| | | | |
|---|---|---|---|
| 10,196,811 B2 * | 2/2019 | Foerg | E04B 1/84 |
| 10,626,598 B2 * | 4/2020 | Klein | B32B 9/007 |
| 2005/0032934 A1 * | 2/2005 | Muenzenberger | C08L 33/08 |
| | | | 524/404 |

* cited by examiner

Primary Examiner — Michael A Tolin
(74) Attorney, Agent, or Firm — Thomas E. Loop

(57) ABSTRACT

A composite fire-rated gasket for use in building construction is disclosed that comprises, in a multi-layered stacked configuration, the following elements: (1) a flexible flat sheet metal strip having a width and opposing first and second faces; (2) an intumescent strip adjacent to the first face of the sheet metal strip; (3) a first foamed plastic strip adjacent to the second face of the sheet metal strip; (4) a second foamed plastic layer adjacent to the intumescent strip; and (5) an elongated non-foamed protective material layer adjacent to the second foamed plastic layer. In a preferred embodiment, the flat metal strip is in the form of a spine having a plurality of ribs outwardly extending therefrom. The composite fire-rated gaskets and related building construction assemblies disclosed herein slow and impede the spread of fire and smoke (during a fire) and also reduces sound transmission between adjacent rooms in a building.

11 Claims, 2 Drawing Sheets

Related U.S. Application Data continuation of application No. 16/020,647, filed on Jun. 27, 2018, now Pat. No. 10,626,598, which is a continuation-in-part of application No. 15/675,332, filed on Aug. 11, 2017, now Pat. No. 11,401,711.

(60) Provisional application No. 62/602,687, filed on May 3, 2017, provisional application No. 62/602,685, filed on May 3, 2017, provisional application No. 62/601,747, filed on Mar. 31, 2017.

(51) Int. Cl.
| | | |
|---|---|---|
| *B32B 5/18* | (2006.01) | |
| *B32B 7/12* | (2006.01) | |
| *E04B 1/94* | (2006.01) | |
| *E04B 1/76* | (2006.01) | |
| *E04B 2/74* | (2006.01) | |
| *B32B 5/24* | (2006.01) | |
| *B32B 9/00* | (2006.01) | |
| *B32B 9/04* | (2006.01) | |

(52) U.S. Cl.
CPC ... *B32B 2307/3065* (2013.01); *B32B 2313/04* (2013.01); *B32B 2405/00* (2013.01); *B32B 2581/00* (2013.01); *E04B 1/948* (2013.01); *E04F 2290/045* (2013.01)

(58) Field of Classification Search
CPC .......... E04B 1/76; E04B 1/948; E04B 2/7411; E04F 2290/045
See application file for complete search history.

COMPOSITE FIRE-RATED GASKET FOR USE INBUILDING CONSTRUCTION

CROSS-REFERENCE TO RELATED APPLICATIONS

This application is a continuation-in-part of U.S. application Ser. No. 16/853,281 filed on Apr. 20, 2020 (now abandoned), which application is a continuation of U.S. application Ser. No. 16/020,647 filed on Jun. 27, 2018 (now U.S. Pat. No. 10,626,598), which application is a continuation-in-part of U.S. application Ser. No. 15/675,332 filed on Aug. 11, 2017 (now U.S. Pat. No. 11,401,711), which application claims the benefit of U.S. Provisional Application No. 62/601,747 filed on Mar. 31, 2017, U.S. Provisional Application No. 62/602,687 filed on May 3, 2017, and U.S. Provisional Application No. 62/602,685 filed on May 3, 2017, all of which applications are incorporated herein by reference in their entireties for all purposes.

TECHNICAL FIELD

The present invention relates generally to building construction systems for sound and fire-blocking and, more particularly, to sound and fire-block products used to seal interfaces or junctions between (i) outward facing perimeter surfaces of an unfinished wall assembly (e.g., a wall assembly framed from sheet metal C-shaped studs positioned between U-shaped header and footer tracks) and (ii) the inner contact surfaces of a wallboard overlay (associated with the finished wall assembly).

BACKGROUND OF THE INVENTION

In the building construction industry, the sealing of linear interfaces or junctions between perimeter and/or outward facing surfaces of a sheet metal wall assembly (e.g., sheet metal studs between U-shaped tracks) and the inner contact surfaces of the wallboard overlay is an important construction detail that, if properly and compliantly done, promotes life safety (namely, by preventing and/or by reducing the spread of fire and smoke in the event of a building fire).

Nowadays, there are two primary methods used for sealing linear junctions (e.g., head-of-wall joints and expansion joints) against the spread of fire and smoke; namely, by (1) applying a firestop intumescent sealant (in the form of either a caulk, tape, or spray) along and into the linear joint, or (2) installing a specialty track and/or (other suitable specialty framing member) that has had a pre-applied intumescent tape appropriately placed on the track/framing member (such that the intumescent tape seals the linear construction joint). These two methods are widely used and both have been tested and certified by Underwriter Laboratories, Inc. ("UL"—an independent worldwide testing and regulatory compliance certification organization) as being compliant with certain specified fire and hose stream UL test standards.

For example, UL has tested and certified various building construction "joint systems" in accordance with their testing standards set forth in "UL 2079 Tests for Fire Resistance of Building Joint Systems, fifth edition (Aug. 26, 2015)." These enhanced UL fire test standards apply to a large number of building construction joint systems (and related wall assemblies) of various materials and construction. UL's joint system fire tests evaluate the length of time that a specified joint system will contain a fire during a predetermined/controlled exposure to fire. Consequently, UL's joint system fire tests evaluate the joint system's resistance to heat and, in some instances, to a hose stream, while carrying an applied load (if the assembly is load bearing). UL's joint system fire tests may, in some instances, include an air leakage test to determine the rate of air leakage through joint systems resulting from a specified air pressure difference applied across the surface of the joint system.

In the building construction industry, metal framing assemblies are commonly used to construct commercial and residential buildings. Metal framing assemblies are generally constructed from a plurality of metal framing members including studs, joists, trusses, and other metal posts and beams formed from sheet metal (and frequently fabricated to have the same general cross-sectional dimensions as standard wooden members used for similar purposes). Metal framing members are typically constructed by either brake-pressing or roll-forming (with both methods being referred to as "cold-formed" processing) 12-to-24-gauge galvanized sheet steel. Although many cross-sectional shapes are available, the primary shapes used in building construction are C-shaped studs and U-shaped tracks. For example, most wall assemblies are constructed from U-shaped tracks fastened to the floor (footer) and ceiling (header) with a plurality of C-shaped studs laterally spaced apart, and vertically positioned between, the opposing header and footer tracks. The sealing of perimeter and head-of-wall linear joints is an important aspect of building construction because a robust and effective seal can impede and/or prevent the spread of fire and smoke.

Although some progress has been made in recent years, there is still a need in the art for new and improved fire, smoke and sound blocking products that better promote life safety—including innovative building construction firestop products that better seal linear construction joints (for purposes of impeding the transmission of fire and smoke in the event of a building fire, and/or impending the transmission of sound from one room to another). The present invention fulfills these needs and provides for further related advantages.

SUMMARY OF THE INVENTION

In brief, the present invention is directed to a multi-layered composite "fire-rated gasket" (commonly referred to as FRG) for use in building construction, as well as to various building construction framing members (comprising all profiles) in combination with the composite fire-rated gasket (FRG). In particular, and based on UL fire testing, the multi-layered composite fire-rated gasket of the present invention better (and more economically) seals linear construction joints against the transmission of fire, smoke, and/or sound than similar intumescent tape products known in the art. In one preferred embodiment, the composite fire-rated gasket (FRG) product comprises a stacked multi-layered composite structure that includes the following discrete (but bonded together) layers: (1) an elongated central thin flat backing strip (e.g., sheet metal, chicken wire, ceramic, fiber glass, or other like material) having a first width and opposing first and second faces; (2) an elongated intumescent material strip lengthwise adjacent to the first face of the backing strip (wherein the width of the intumescent material strip is equal to or less than the width of the backing strip); (3) an elongated first foamed plastic strip lengthwise adjacent to the second face of the sheet metal strip; (4) an elongated second foamed plastic strip lengthwise adjacent to the intumescent material strip; and (5) an elongated non-foamed protective material layer lengthwise adjacent to the second foamed plastic layer. Preferably, the widths of the first and second foamed plastic strips, and the non-foamed protective material strip, are all about the same (e.g., width, w=~3.75 inches) and greater than the width of the backing strip (e.g., ~3.25 inches). Thus, the width of the intumescent material strip is about the same or less than the width of the backing strip—thereby ensuring that the edges of the composite fire-rated gasket are laterally flexible for enhanced sealing against an adjoining substrate.

In further preferred embodiments, the composite fire-rated gasket (FRG) product additionally comprises a flexible "peel-away" backing/release layer lengthwise adjacent to the second foamed plastic strip. In still further embodiments, the first and second foamed plastic layers are in the form of a "double-coated" foamed tape product (with double-coated simply meaning that the opposing faces of the tape product have had an adhesive coating pre-applied thereon), while the non-foamed protective material layer may be a non-woven fibrous olefinic material (i.e., TYVEK). In a preferred embodiment, the central backing strip is a sheet metal strip that has been selectively cut (e.g., die punched) to form a central flat spine having a plurality of flat ribs extending outwardly therefrom.

The composite fire-rated gasket (FRG) product may be characterized as a "peel away" backing/release layer—foamed plastic layer—intumescent layer—backing layer—foamed plastic layer—non-foamed protective layer composite sandwich construction.

These and other aspects of the present invention will become more evident upon reference to the following detailed description and attached drawings. It is to be understood, however, that various changes, alterations, and substitutions may be made to the specific embodiments disclosed herein and still be within the scope of the present invention.

BRIEF DESCRIPTION OF THE DRAWINGS

The drawings are intended to be illustrative and symbolic representations of certain exemplary embodiments of the present invention (and as such they are not necessarily drawn to scale). In addition, it is to be expressly understood that the relative dimensions and distances depicted in the drawings (and described in the "Detailed Description of the Invention" section) are exemplary and may be varied in numerous ways without departing from the scope of the invention (as defined by the claims). Finally, like reference numerals have been used to designate like features throughout the several views of the drawings.

DETAILED DESCRIPTION OF THE INVENTION

Figure 1A:
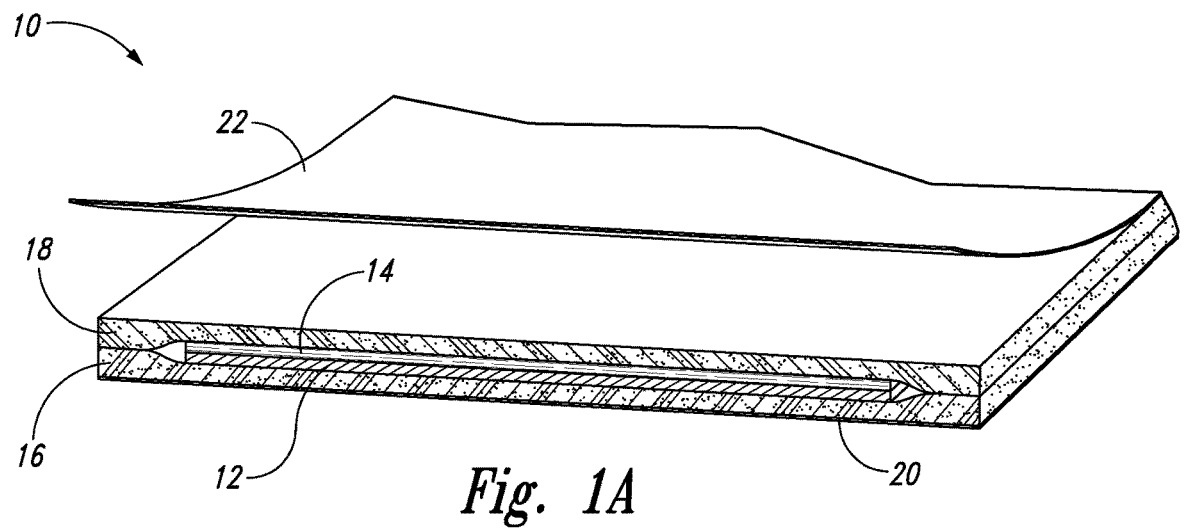
FIG. 1A is a perspective end side view of an elongated multi-layered stacked composite fire-rated gasket (FRG) product for use in building construction in accordance with an embodiment of the present invention, wherein the central sheet metal strip has been selectively cut (e.g., die punched) to form a central flat spine having a plurality of flat ribs extending outwardly therefrom (hidden from view but shown in FIG. 1B), and wherein a flexible "peel-away" backing/release layer is shown being partially pulled away from the adhesive layer.

In the following detailed description, reference is made to the accompanying drawings, which form a part hereof. In the drawings, similar symbols or markings have been used to identify like or corresponding elements, unless context dictates otherwise. The illustrative embodiments described in the detailed description, drawings, and claims are not meant to be limiting. Other embodiments may be utilized, and other changes may be made, without departing from the spirit or scope of the invention disclosed herein.

Figure 1B:
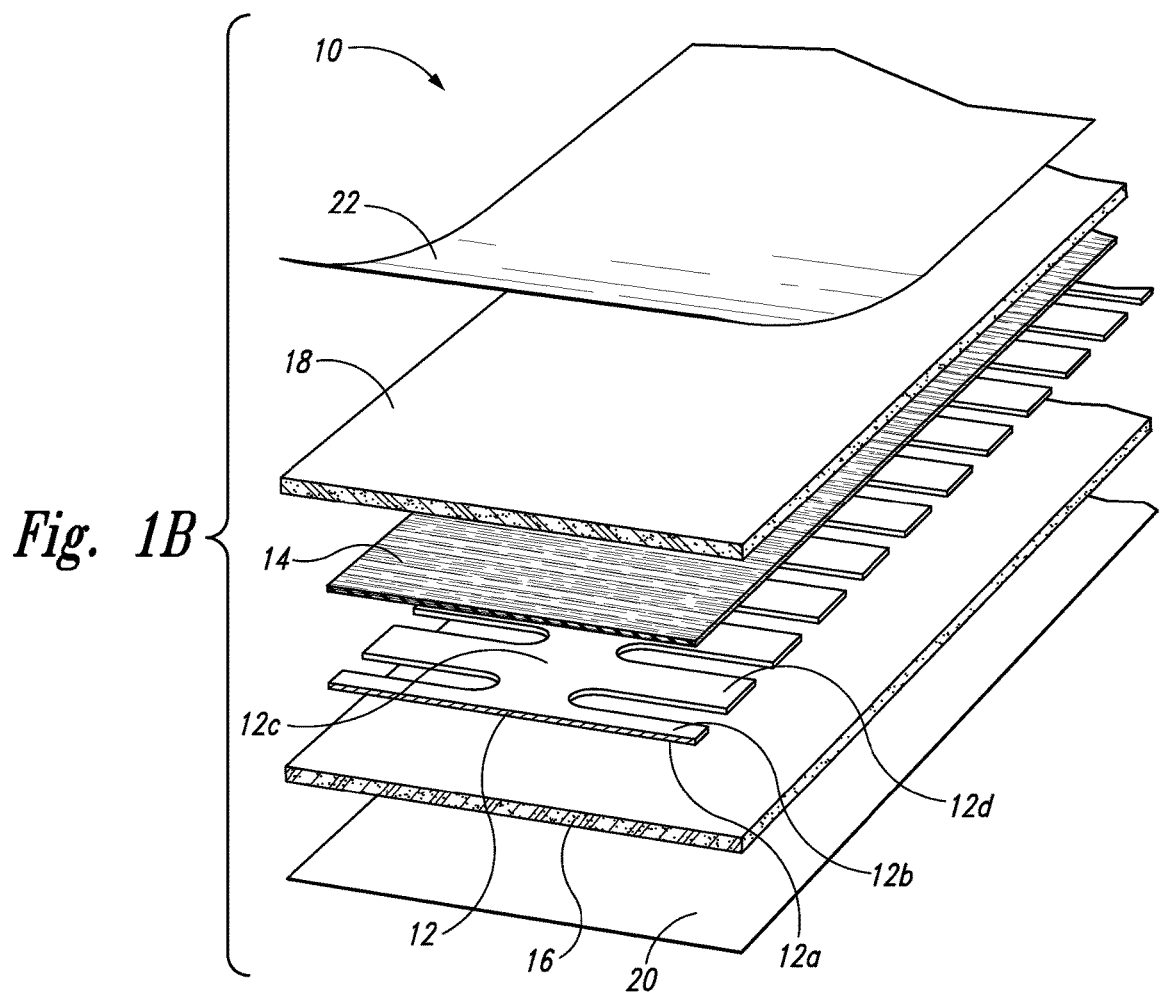
FIG. 1B is an exploded perspective view of the multi-layered stacked composite fire-rated gasket (FRG) product shown in FIG. 1A, wherein, and for purposes of illustration, the various layers of the product are shown separated from one another.

Accordingly, and as best shown in FIGS. 1A-B (showing a preferred embodiment), the present invention in an embodiment is directed to a multi-layered composite "fire-rated gasket" 10 (commonly referred to as FRG), which product has been especially designed for use as an enhanced sound and/or fire-block in building construction. As shown, the composite fire-rated gasket 10 comprises a stacked multi-layered composite structure that is both rectilinear and elongated (available in standard 4-foot lengths, for example). The inventive composite fire-rated gasket 10 includes the following discrete (but bonded together) layers: (1) a central backing strip 12; (2) an intumescent material strip 14 (on one side of the central backing strip 12), (3) a first foamed plastic strip 16 (on the other side of the central backing strip 12), (4) a second foamed plastic strip 18 (on the intumescent material strip 14); (5) a non-foamed protective material layer 20 (on the first foamed plastic strip 16); and (6) a "peel away" backing/release layer 22 (on the second foamed plastic strip 18). Without necessarily prescribing to any particular scientific theory, it is believed that an unexpected synergistic effect results from the combination and unification of these different layers into a composite sound and fire-block product—an innovative sound and fire-block product that is easy to apply in the field and better performing per UL standards.

More specifically, the elongated central backing strip 12 is relatively thin (e.g., ~0.01 inches in thickness such as 12-gauge steel, but may made of chicken wire, ceramic, fiber glass, or other like material) has a first width (e.g., 3.25 inches) and opposing first and second faces 12a, b. The elongated intumescent material layer (i.e., a strip) 14 is positioned lengthwise adjacent to the first face 12a of the backing strip 12. In a preferred embodiment (as shown), the width of the intumescent material strip 14 (e.g., 3.25 inches or less) is about equal to (or may be less than) the width of the backing strip 12. The elongated first foamed plastic strip 16 is positioned lengthwise adjacent to the second face 12b of the backing strip 12. Similarly, the elongated second foamed plastic layer 18 is positioned lengthwise adjacent to the intumescent strip 14, whereas the elongated non-foamed protective material layer 20 is positioned adjacent to the second foamed plastic layer 18.

Preferably, and as shown, all of the various layers that make up the composite fire-rated gasket 10 have approximately the same length (e.g., 4.0 feet). The widths and thicknesses of the various individual layers that make-up the composite fire-rated gasket 10, however, generally differ from one another. In a preferred embodiment (as shown), the widths and thicknesses of the different layers that make-up the composite fire-rated gasket 10 may be as follows: (1) the central backing strip 12 is about 0.01 inches thick (12-gauge steel) and about 3.25 inches wide; (2) the intumescent strip 14 is about 0.07 inches thick and about 3.25 inches (or less) wide, (3)-(4) the first and second foamed plastic strips 16, 18 are each about 0.08 inches thick and about 3.75 inches wide; (5) the non-foamed protective material layer 20 is about 0.005 inches thick and also about 3.75 inches wide; and, finally, (6) the "peel away" backing/release layer 22 is also about 0.005 inches thick and also about 3.75 inches wide.

The backing strip 12 and the intumescent strip 14 are both generally flexible along their respective lengths, but may nevertheless be significantly more rigid than the first and second foamed plastic strips 16, 18, which are generally pliable in all directions. Because the backing strip 12 and the intumescent strip 14 each have a width (e.g., 3.25 inches) that is slightly less than the widths of the first and second foamed plastic strips 16, 18, they are enveloped by the first and second foamed plastic strips 16, 18 (as shown) such that the lengthwise edges of the composite fire-rated gasket 10 are laterally flexible and pliable (when the sheet metal strip 12 is centred therebetween).

Figure 2A:
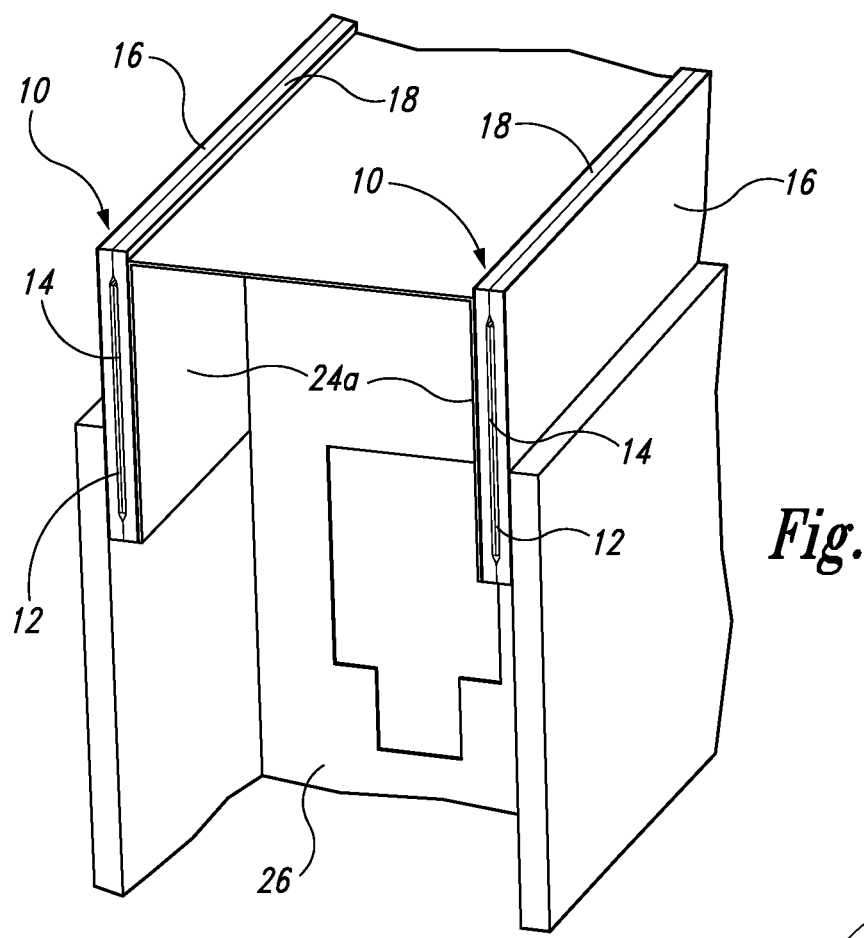
FIG. 2A is an end perspective view of a composite fire-rated gasket (FRG) product attached to a head-of-wall assembly having a wallboard overlay in accordance with an embodiment of the present invention.
Figure 2B:
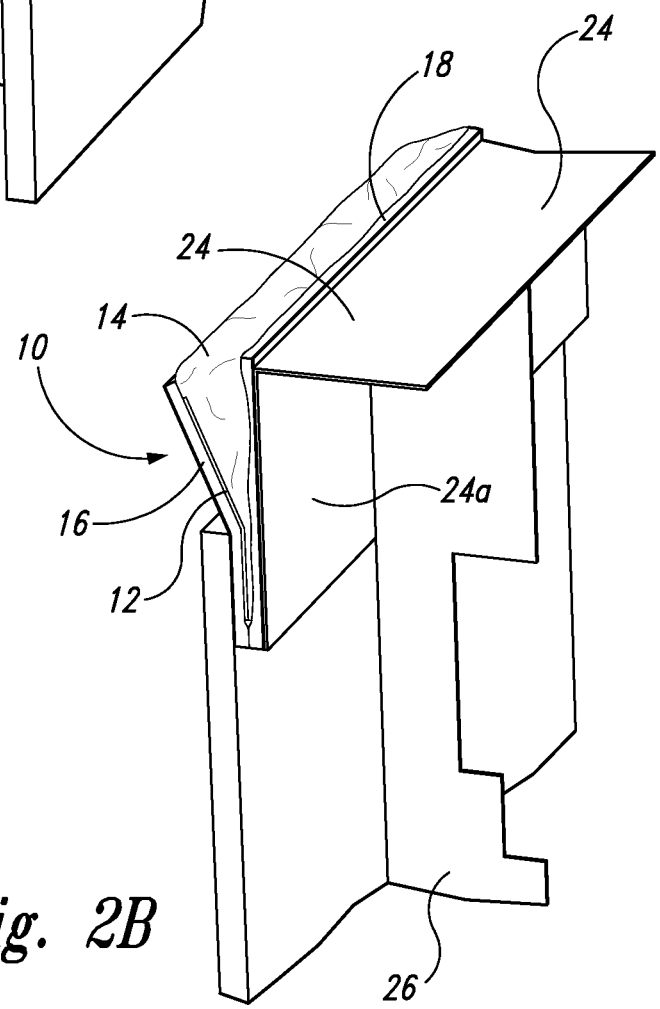
FIG. 2B is a cross-sectional end perspective view of the composite fire-rated gasket (FRG) product attached to the head-of-wall assembly shown in FIG. 2A, wherein heat from a fire has caused the intumescent material layer/strip to outwardly swell and, in so doing, to also outwardly bend (while being retained by) a top row of ribs (outwardly extending from a central spine) of the sheet metal strip in accordance with an embodiment of the present invention.

As shown in FIG. 1B, the flat backing strip 12 is preferably in the form of a metal spine 12c having a plurality of ribs 12d outwardly extending therefrom. As shown in FIGS. 2A-B, and during and/or after a fire event, the plurality of ribs 12d are able to retain (hold back) the intumescent strip 14 (as it expands outwardly), while at the same time allows the efficient transfer of heat energy to the first foamed plastic strip 16 where its further transfer is impeded. The dimensions and spacing of the plurality of ribs 12d may be uniform. For example, and for ease of manufacturing, the plurality of ribs 12d may be spaced equidistant apart from one another (e.g., by a distance of about 0.25 inches) and may all be substantially the same in size (e.g., rectangles having dimensions of about 1.0×1.25 inches).

The "peel away" backing/release layer 22 is preferably a wax coated flexible release paper (and thus may be easily separated from the underlying on the second foamed plastic strip 18). In practice, the flexible backing/release layer 22 is manually removed from the composite fire-rated gasket (FRG) 10 just prior to the gasket's use (application) in the field (to seal linear construction joints). By removing the flexible backing/release layer 22, an underlying adhesive layer (not shown) is exposed thereby allowing adhesion of the composite fire-rated gasket 10 directly onto a targeted substrate (e.g., the downwardly extending flanges of a U-shaped track). The adhesive layer is preferably an acrylic based pressure-sensitive adhesive; however, other adhesives such as polyurethane-based adhesives also work and are within the scope of the present invention.

The first and second foamed plastic strips 16, 18 are preferably, but not necessarily, a closed-cell foamed polyolefin (thermoplastic) material having a plurality of internal and uniformly dispersed "closed cells" with diameters ranging from about 100 to about 1,000 microns. A closed-cell foam is one where distinct bubbles of gas are trapped individually within the plastic. The foamed polyolefin is preferably a high-density semi-crystalline polyethylene material; it may, however, comprise other polymers such as, for example, polypropylene, polyurethane, and/or polystyrene. The first and second foamed plastic strips 16, 18 are preferably both made from the same plastic material.

In some preferred embodiments, the intumescent material strip 14 contains expandable-graphite dispersed within a polymeric binder, whereas the elongated non-foamed protective material layer 20 is a TYVEK material (i.e., a non-woven fibrous olefinic material).

With regards to the sealing of linear expansion joints and without necessarily prescribing to any particular scientific theory, the composite fire-rated gasket 10 of the present invention is believed to work substantially better than traditional intumescent caulks, sprays, tapes and prior gaskets because of the synergistic effect associated with the various layers working together in concert. More particularly, the closed cells (of the second foamed plastic layer 18) are believed to act as tiny insulators that (collectively) slow/impede the flow of heat to the "heat-sensitive" intumescent material strip 14. In addition, it takes significant heat energy (e.g., latent heat of melting) to absorb into and melt the solid plastic of the second foamed plastic strip 18 (closest to heat source) which, in turn, slows the flow of heat from the heat source (not shown) to the intumescent material strip 14. Thus, the selection of the type of thermoplastic polymer and its degree of crystallinity, bubble size and density, and layer thickness all affect the rate of heat flow. Because the flow of heat to the intumescent material strip 14 is substantially slowed/impeded by the second foamed plastic strip 18, it takes substantially longer for the intumescent material strip 14 to begin and finish its swell (expansion) cycle, which, in turn, lengthens the amount of time it takes for heat to be transmitted to the first foamed plastic strip 16. Like the second foamed plastic strip 18, the first foamed plastic strip 18, further slows the flow of heat; it also impedes air leakage through the intumescent material strip 14 during its swell (expansion) cycle (during a fire event). During a fire event, the second foamed plastic strip 18 substantially holds the intumescent material strip 14 intact and prevents air leakage through the composite fire-rated gasket 10.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing descriptions, and all changes that come within the meaning and range of equivalency of the claims are to be embraced within their scope.

What is claimed is:

1. A composite fire-rated gasket for use in building construction, wherein the composite fire-rated gasket is a multi-layered structure, comprising:
   an elongated flexible flat backing strip having a width and opposing first and second faces;
   an elongated intumescent material strip lengthwise adjacent to the first face of the backing strip;
   an elongated first foamed plastic strip lengthwise adjacent to the second face of the backing strip;
   an elongated second foamed plastic strip lengthwise adjacent to the intumescent material strip; and
   an elongated non-foamed protective material strip lengthwise adjacent to the first foamed plastic strip;
   wherein the backing strip is a sheet metal strip; and
   wherein widths of the first and second foamed plastic strips, and the non-foamed protective material strip, are all about the same and greater than the width of the sheet metal strip, and wherein a width of the intumescent material strip is about the same or less than the width of the sheet metal strip.

2. The composite fire-rated gasket of claim 1, further comprising an elongated pliable backing/release layer lengthwise adjacent to the second foamed plastic strip.

3. The composite fire-rated gasket of claim 2, further comprising an adhesive between (i) the sheet metal strip and the intumescent material strip, (ii) the sheet metal strip and the first foamed plastic strip, (iii) the second foamed plastic strip and the backing/release layer, and (iv) the first foamed plastic strip and the non-foamed protective material strip.

4. The composite fire-rated gasket of claim 3 wherein the sheet metal strip is in the form of an elongated lengthwise spine having a plurality of ribs outwardly extending therefrom.

5. The composite fire-rated gasket of claim 4 wherein each of the plurality of ribs is rectangular in shape and spaced apart from one another at regular intervals.

6. The composite fire-rated gasket of claim 5 wherein the spacing between the plurality of ribs is less than a width of each of the plurality of ribs.

7. The composite fire-rated gasket of claim 5 wherein the non-foamed protective material strip is a non-woven fibrous olefinic material.

8. The composite fire-rated gasket of claim 4 wherein the first and second foamed plastics strips have a micro-cellular foam structure.

9. The composite fire-rated gasket of claim 4 wherein a thickness of the intumescent material strip and the first and second foamed plastic strips are each about the same and are each greater than a thicknesses of the sheet metal strip, and wherein a thickness of the non-foamed protective material strip is less than the thickness of the sheet metal strip.

10. The composite fire-rated gasket of claim 1 wherein the first and second foamed plastic strips are both made from the same material.

11. The composite fire-rated gasket of claim 10 wherein the intumescent material strip contains expandable-graphite dispersed within a polymeric binder.

\* \* \* \* \*